US010257831B2

(12) United States Patent
Geraci et al.

(10) Patent No.: US 10,257,831 B2
(45) Date of Patent: Apr. 9, 2019

(54) ADAPTIVE ALLOCATION OF TEMPORAL RESOURCES FOR MASSIVE MULTIPLE-INPUT-MULTIPLE-OUTPUT (MIMO) IN UNLICENSED FREQUENCY BANDS

(71) Applicant: Alcatel Lucent, Boulogne-Billancourt (FR)

(72) Inventors: Giovanni Geraci, Dublin (IE); Adrian J. Garcia Rodriguez, Blanchardstown (IE); Lorenzo Galati Giordano, Blanchardstown (IE); David Lopez Perez, Blanchardstown (IE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 15/446,313

(22) Filed: Mar. 1, 2017

(65) Prior Publication Data
US 2018/0255551 A1 Sep. 6, 2018

(51) Int. Cl.
*H04W 72/00* (2009.01)
*H04W 72/04* (2009.01)
(Continued)

(52) U.S. Cl.
CPC ...... *H04W 72/0453* (2013.01); *H04B 7/0413* (2013.01); *H04B 17/345* (2015.01);
(Continued)

(58) Field of Classification Search
CPC .... H04B 17/345; H04B 7/0845; H04B 15/00; H04W 74/0808; H04W 72/082; H04W 74/006
(Continued)

(56) References Cited

U.S. PATENT DOCUMENTS 8,488,724 B2  7/2013 Daneshrad et al.
8,718,560 B2  5/2014 Jin et al.
(Continued)

OTHER PUBLICATIONS

U.S. Appl. No. 15/446,324, filed Mar. 1, 2017, listing Adrian J. Garcia Rodriguez et al. as inventors, entitled "Dynamic Interference Suppression for Massive Multiple-Input-Multiple-Output (MIMO) in Unlicensed Frequency Bands".
(Continued)

*Primary Examiner* — Dai Phuong
(74) *Attorney, Agent, or Firm* — Nokia Technologies Oy (57) ABSTRACT

A node is configured for connection to a massive multiple-input, multiple-output (MIMO) array to provide spatially multiplexed channels in an unlicensed frequency band. The node includes a memory configured to store samples of non-spatially filtered signals received by the node during a first listen-before-talk (LBT) operation used to acquire the unlicensed frequency band. The node also includes a processor configured to determine, based on a number of previously stored samples, a duration of a silent time interval during which the node collects samples of non-spatially filtered signals and stores the samples in the memory. The node further includes a transceiver configured to perform a second LBT operation to acquire the unlicensed frequency band using a spatial filter determined based on the samples stored in the memory.

16 Claims, 8 Drawing Sheets

(51) Int. Cl.
  *H04L 29/06* (2006.01)
  *H04B 7/0413* (2017.01)
  *H04W 16/14* (2009.01)
  *H04B 17/345* (2015.01)
  *H04W 74/08* (2009.01)
(52) U.S. Cl.
  CPC ............ *H04L 69/28* (2013.01); *H04W 16/14* (2013.01); *H04W 74/0808* (2013.01)
(58) Field of Classification Search
  USPC ............... 455/9–10, 13.3, 17, 41.2, 59–63.4, 455/328–330, 334
  See application file for complete search history.

(56) References Cited

U.S. PATENT DOCUMENTS

| | | | |
|---|---|---|---|
| 9,332,465 B2 | 5/2016 | Valliappan et al. | |
| 2012/0329402 A1* | 12/2012 | Ren | H04W 24/10 455/67.11 |
| 2013/0012134 A1* | 1/2013 | Jin | H04B 7/0845 455/62 |
| 2013/0017794 A1 | 1/2013 | Kloper et al. | |
| 2013/0329576 A1* | 12/2013 | Sinha | H04W 52/0229 370/252 |
| 2014/0337873 A1* | 11/2014 | Krug | H04H 60/33 725/18 |
| 2015/0146645 A1* | 5/2015 | Sergeyev | H04L 5/0032 370/329 |
| 2015/0146680 A1* | 5/2015 | Luo | H04L 5/0035 370/330 |
| 2015/0382374 A1* | 12/2015 | Bhorkar | H04W 24/00 370/330 |
| 2016/0337869 A1* | 11/2016 | Dai | H04W 74/085 |
| 2016/0366594 A1* | 12/2016 | Chang | H04W 16/14 |
| 2017/0013642 A1* | 1/2017 | Yan | H04L 5/0053 |
| 2017/0150500 A1* | 5/2017 | Ahn | H04W 28/02 |
| 2017/0202007 A1* | 7/2017 | Miao | H04W 72/04 |
| 2018/0255534 A1* | 9/2018 | Wang | H04L 5/0053 |
| 2018/0279333 A1* | 9/2018 | Fischer | H04W 72/1215 |

OTHER PUBLICATIONS

Notice of Allowance dated Apr. 11, 2018 for U.S. Appl. No. 15/446,324.

European Patent Application No. 16193756.0, filed Oct. 13, 2016, entitled "Sharing Resources in an Unlicensed Frequency Band".

European Patent Application No. 16201985.5, filed Dec. 2, 2016, entitled "Scheduling User Equipment in the Unlicensed Band".

Zhang, et al., "LTE-Unlicensed: The Future of Spectrum Aggregation for Cellular Networks", IEEE Wireless Communications, Jun. 2015, 10 pages.

Qualcomm Research, "LTE in Unlicensed Spectrum: Harmonious Coexistence with Wi-Fi", Jun. 2014, 19 pages.

"3GPP; Technical Specification Group Radio Access Network; Study on Licensed-Assisted Access to Unlicensed Spectrum; Release 13", 3GPP TR 36.889, V1.0.1, Jun. 2015, 285 pages.

* cited by examiner

ADAPTIVE ALLOCATION OF TEMPORAL RESOURCES FOR MASSIVE MULTIPLE-INPUT-MULTIPLE-OUTPUT (MIMO) IN UNLICENSED FREQUENCY BANDS

BACKGROUND

Unlicensed frequency bands are portions of the radiofrequency spectrum that do not require a license for use and may therefore be used by any device compliant with regulations to transmit or receive radiofrequency signals. Wireless communication devices that transmit or receive signals in licensed or unlicensed frequency bands are typically referred to as nodes, which may include Wi-Fi access points that operate according to IEEE 802.11 standards in the unlicensed spectrum. Nodes also include base stations that operate in the licensed spectrum according to standards such as Long Term Evolution (LTE) standards defined by the Third Generation Partnership Project (3GPP). Base stations that operate according to LTE can implement supplementary downlink (SDL) channels in the unlicensed spectrum to provide additional bandwidth for downlink communications to user equipment that are also communicating with the base station using channels in a licensed frequency band. The licensed frequency bands may be referred to as LTE-L bands and the unlicensed frequency bands may be referred to as LTE-U bands. Base stations may also operate in the unlicensed frequency bands according to Licensed Assisted Access (LAA) standards. Base stations may operate solely in the unlicensed frequency bands without support in licensed frequency bands, e.g., according to emerging standards such as MuLTEFire.

In dense networks, channels in the unlicensed frequency bands can be reused by nodes that operate according to different radio access technologies (RATs) such as Wi-Fi access points and LTE base stations. Communication by the nodes that operate according to the different RATs is coordinated using clear channel assessment techniques to reduce interference between transmissions by the different nodes. For example, listen before talk (LBT) coexistence rules require that each node monitors a channel (e.g., "listens") to detect energy on the channel prior to transmitting information on the channel. If the detected energy level is below a threshold level, the channel is considered clear and the node is free to transmit on the channel for a predetermined time interval. If the detected energy level is above the threshold level, which indicates that the channel is not clear because another node is transmitting on the channel, the listening node backs off until the energy level falls below the threshold before making another attempt to acquire the channel. The energy detection threshold for Wi-Fi is −62 decibel-milliwatts (dBm) and the energy detection threshold for LTE-U, LAA is −72 dBm, and MuLTEFire is −72 dBm. Wi-Fi nodes may also perform Wi-Fi preamble decoding on signals with detected energy levels below the energy detection threshold and above −82 dBm. The Wi-Fi node backs off if it successfully decodes preambles in transmissions by other Wi-Fi nodes at an energy level between −62 dBm and −82 dBm.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The large number of antennas in a massive multiple-input multiple-output (MIMO) array used by a node provides a large number of spatial degrees of freedom that can support spatially multiplexed communication with multiple user equipment. For example, a massive MIMO array of N antennas can provide a spatially multiplexed channel to each of K user equipment as long as N≥K. Additional spatial degrees of freedom can be allocated to interference suppression to improve coexistence with other transmitters, such as interfering Wi-Fi nodes. For example, interference with D single-antenna interfering nodes can be suppressed by allocating D degrees of freedom to spatial nulls that are placed onto spatial directions corresponding to the D interfering nodes, where D≤N−K. Placement of the spatial nulls is determined based on an estimate of a covariance matrix that represents the channel subspace occupied by the interfering nodes. The massive MIMO node is therefore required to remain silent for a time interval to measure signals received from the interfering nodes. The signals measured during the silent time interval are then used to determine the covariance matrix. Allocating a larger silent time interval improves the accuracy of the estimated covariance matrix, which enables more effective interference suppression and increases the likelihood of a successful LBT acquisition of the unlicensed frequency band. However, data cannot be transmitted during the silent time interval so increasing the silent time interval reduces the time available for data transmission.

The performance of a node that uses a massive MIMO array to provide spatially multiplexed channels to a plurality of user equipment in an unlicensed frequency band is improved by buffering samples of non-spatially filtered signals received by the massive MIMO array during LBT operations performed by the node and determining a duration of a silent time interval for the node based on a number of buffered samples of the non-spatially filtered signals. For example, the number of buffered samples of non-spatially filtered signals can be compared to a target number of samples. The silent time interval is set to zero if the number of buffered samples is greater than or equal to the target number. If the number of buffered samples is less than the target number, the silent time interval is set to a value sufficient to acquire a number of samples that is equal to a difference between the number of buffered samples and the target number. Some embodiments of the node retain the buffered samples for a validity time interval. Buffered samples that were acquired more than the validity time interval prior to a current time are discarded. The target number and, in some embodiments, the validity time interval are dynamically determined based on an outcome of a previous LBT operation. For example, the target number (and in some embodiments the validity time interval) can be decreased in response to a successful outcome of the previous LBT operation and increased in response to an unsuccessful outcome of the previous LBT operation.

Figure 1:
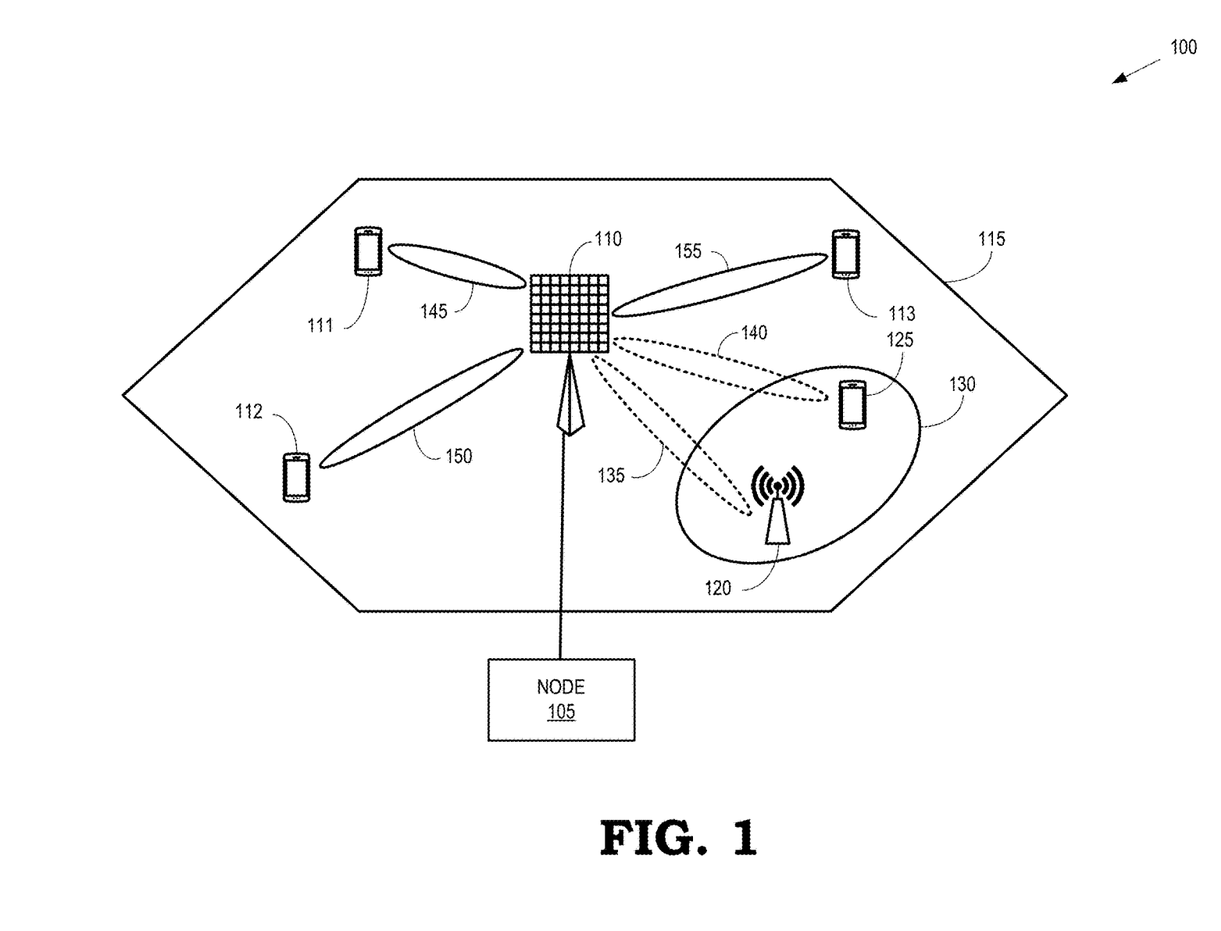
FIG. 1 is a block diagram of a wireless communication system according to some embodiments.

FIG. 1 is a block diagram of a wireless communication system 100 according to some embodiments. The wireless communication system 100 includes a node 105 that is connected to a massive MIMO array 110 that includes a number (N) of antenna elements that are used for beamforming of transmitted downlink signals and multiplexing of received uplink signals. In the illustrated embodiment, the massive MIMO array 110 is implemented as a two-dimensional array of antenna elements that are depicted as small squares in FIG. 1. However, some embodiments of the massive MIMO array 110 are implemented using other antenna configurations including a linear array of antenna elements, a cylindrical array of antenna elements, and the like. The node 105 generates downlink signals for transmission by the massive MIMO array 110 (e.g., beamforming) and processes uplink signals that are received by the massive MIMO array 110 (e.g., multiplexing), as discussed herein.

The node 105 and the massive MIMO array 110 serve a plurality of user equipment 111, 112, 113 within a coverage area or cell 115. The user equipment 111, 112, 113 are collectively referred to herein as "the user equipment 111-113." The number (N) of antenna elements in the massive MIMO array 110 is larger than the maximum number ($K_{MAX}$) of user equipment that are served by the node 105 and the massive MIMO array 110. For example, the number (K) of the user equipment 111-113 served by the massive MIMO array 110 in the embodiment shown in FIG. 1 is three. The massive MIMO array 110 implements N=64 antenna elements to serve the K=3 user equipment 111-113. Thus, in this embodiment, N>>K. However, implementations of the massive MIMO array 110 are not limited to N=64 antenna elements serving three user equipment. Some embodiments of the massive MIMO array 110 implement more or fewer antenna elements to serve more or fewer user equipment. For example, a massive MIMO array can implement hundreds or thousands of antenna elements to serve tens or hundreds of user equipment, respectively.

Some embodiments of the node 105 and the massive MIMO array 110 provide wireless connectivity to the user equipment 111-113 in an unlicensed frequency band. Unlicensed frequency bands are portions of the radiofrequency spectrum that do not require a license for use and can therefore be used by any device to transmit or receive radiofrequency signals. For example, the Unlicensed National Information Infrastructure (UNIT) is formed of portions of the radio spectrum that include frequency bands in the range of 5.15 GHz to 5.825 GHz. For another example, the industrial, scientific, and medical (ISM) radio bands are portions of the radio spectrum that are reserved internationally for unlicensed communication. The ISM radio bands include bands with a center frequency of 2.4 GHz and a bandwidth of 100 MHz, a center frequency of 5.8 GHz and a bandwidth of 150 MHz, and a center frequency of 24.125 GHz and a bandwidth of 250 MHz, among other frequency bands. Unlicensed frequency bands can be contrasted to licensed frequency bands that are licensed to a particular service provider and are only used for wireless communication that is authorized by the service provider or license holder.

The node 105 and the massive MIMO array 110 are required to coexist with other devices that operate according to the same or different radio access technologies in the unlicensed frequency bands. Some embodiments of the node 105 and the massive MIMO array 110 operate according to LTE standards and are configured to coexist with other devices, such as Wi-Fi nodes 120, 125 that operate within a small cell 130 that is served by the Wi-Fi node 120. The node 105 can enhance coexistence with the Wi-Fi nodes 120, 125 by utilizing a subset of the degrees of freedom of the massive MIMO array 110 to place spatial nulls 135, 140 on spatial directions corresponding to the Wi-Fi nodes 120, 125. The node 105 utilizes another (mutually exclusive) subset of the degrees of freedom of the massive MIMO array 110 to support spatial channels 145, 150, 155 that are used for beamforming or multiplexing in the spatial directions corresponding to the user equipment 111-113. The spatial nulls 135, 140 and the spatial channels 145, 150, 155 are represented by a spatial filter generated in the node 105 based on a covariance matrix associated with the Wi-Fi nodes 120, 125, channel state information from user equipment 111, 112, 113, and the number of degrees of freedom in the subset that is allocated to support the spatial nulls 135. Thus, the node 105 supports communication in a first subspace of spatial channels 145, 150, 155 and generates spatial nulls 135, 140 in a second subspace of spatial channels that is orthogonal to the first subspace.

The node 105 is configured to adaptively allocate temporal resources used to monitor interfering nodes (such as the Wi-Fi nodes 120, 125) and collect sample measurements of signals received from the interfering nodes. Some embodiments of the node 105 are configured buffer samples of non-spatially filtered signals received by the node 105 during listen-before-talk (LBT) operations that are used to acquire the unlicensed frequency band. For example, the node 105 can buffer the samples by storing the samples in a memory implemented by (or accessible to) the node 105. The samples of non-spatially filtered signals are also referred to herein as non-spatially filtered samples. The node 105 uses the previously stored samples to determine a duration of a silent time interval during which the node 105 collects samples of non-spatially filtered signals and buffers the samples, e.g., by storing the samples in the memory. Portions of the samples can be discarded from the memory in response to the portion being stored in the memory for more than a validity time interval. The node 105 can then perform one or more subsequent LBT operations to acquire the unlicensed frequency band using a spatial filter determined based on the samples stored in the memory.

Figure 2:
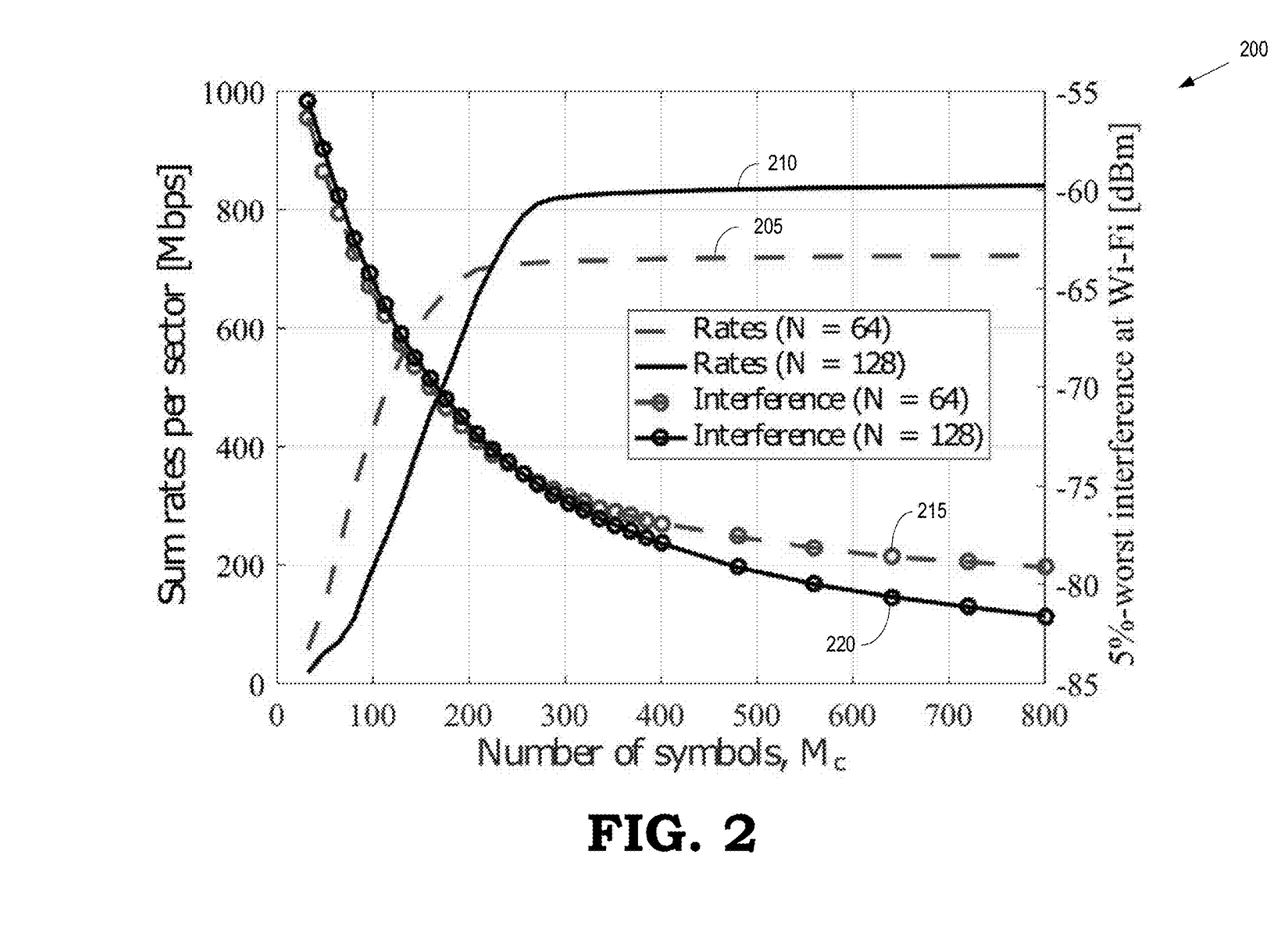
FIG. 2 is a plot that illustrates a sum rate achieved by a massive MIMO array in a sector and a measure of interference suppression as a function of a number of symbols used to estimate a covariance matrix according to some embodiments.

FIG. 2 is a plot 200 that illustrates a sum rate achieved by a massive MIMO array in a sector and a measure of interference suppression as a function of a number of symbols used to estimate a covariance matrix according to some embodiments. The left vertical axis of the plot 200 indicates the sum rate achieved per sector in megabits per second (Mbps). The right vertical axis of the plot 200 indicates interference (in dBm) received by the 5% of the Wi-Fi nodes that receive the most interference from the massive MIMO array during transmissions. The horizontal axis indicates a number of samples that are used to estimate a covariance matrix that is used to define a spatial filter for beamforming of the massive MIMO transmissions and interference suppression from the Wi-Fi nodes. The curve 205 indicates the achieved sum rate for a massive MIMO array that includes N=64 antenna elements and the curve 210 indicates the achieved sum rate for a massive MIMO array that includes N=128 antenna elements. The curve 215 indicates the interference received by the 5% most-interfered Wi-Fi nodes during transmissions by a massive MIMO array that includes N=64 antenna elements and the curve 220 indicates the interference received by the 5% most-interfered Wi-Fi nodes during transmissions by a massive MIMO array that includes N=128 antenna elements.

The curve 205 increases due to the improving success rate of the LBT operation in acquiring the unlicensed frequency band until the achieved sum rate reaches a plateau at approximately 200 symbols. Above the threshold of approximately 200 symbols, increasing the number of symbols used to estimate the covariance matrix provides diminishing returns because sufficient interference suppression is achieved at lower numbers of symbols and increasing the number of symbols increases the overhead by increasing the duration of the silent time interval needed to acquire the symbols. The curve 210 increases until the achieved sum rate reaches a plateau at approximately 260 symbols. The achieved sum rate for the curve 210 at the plateau is larger than the corresponding achieved sum rate for the curve 205 because the larger number of antennas supports improved beamforming and interference suppression. The plateau for the curve 210 occurs at a larger number of symbols than the plateau for the curve 205 because a larger number of symbols are required to accurately estimate the covariance matrix for the larger number of antennas.

The curve 215 indicates that the interference received by the 5% most-interfered Wi-Fi nodes decreases with increasing number of symbols because of the improved estimation of the covariance matrix. However, the rate of improvement in the amount of interference with increasing number of symbols is much higher at lower numbers of symbols than at higher numbers of symbols. Thus, the improvement in the interference received by the 5% most-interfered Wi-Fi nodes reaches a point of diminishing returns at larger numbers of symbols. The curve 220 also indicates that the interference received by the 5% most-interfered Wi-Fi nodes decreases with increasing number of symbols. A comparison of the curves 215, 220 shows that increasing the number of antennas in the massive MIMO array provides a marginal reduction in the amount of interference received by the 5% most-interfered Wi-Fi nodes at larger numbers of symbols.

The curves 205, 210, 215, 220 illustrate that a node connected to the massive MIMO array is less likely to acquire the unlicensed frequency band when the number of samples used to estimate the covariance matrix is small and interfering nodes are transmitting. When the number of samples is small, the accuracy of the estimation of the covariance matrix is insufficient to guarantee a successful LBT operation, or at least to provide a probability of a successful LBT operation that is above a threshold. Furthermore, the interfering nodes receive strong interference from the massive MIMO array when the node is transmitting because the interference generated by the massive MIMO array is not accurately suppressed. On the other hand, the overhead incurred by a large silent time interval can degrade the effective throughput if the number of samples that are collected to estimate the covariance matrix is too large because too much time is allocated to estimating the covariance matrix and too little time is allocated for data transmission.

The plot 200 also illustrates that the optimal value for the number of samples depends on the specific deployment. For example, a larger number of samples is optimal for a larger MIMO array that includes more antenna elements. Furthermore, a static assignment of temporal resources to acquiring samples used for estimation of the covariance matrix does not result in optimal performance of the node because the amount of interference that actually needs to be suppressed varies with time, e.g., because the number of interfering nodes can increase or decrease due to activation, deactivation, mobility, environmental conditions, and the like.

Figure 3:
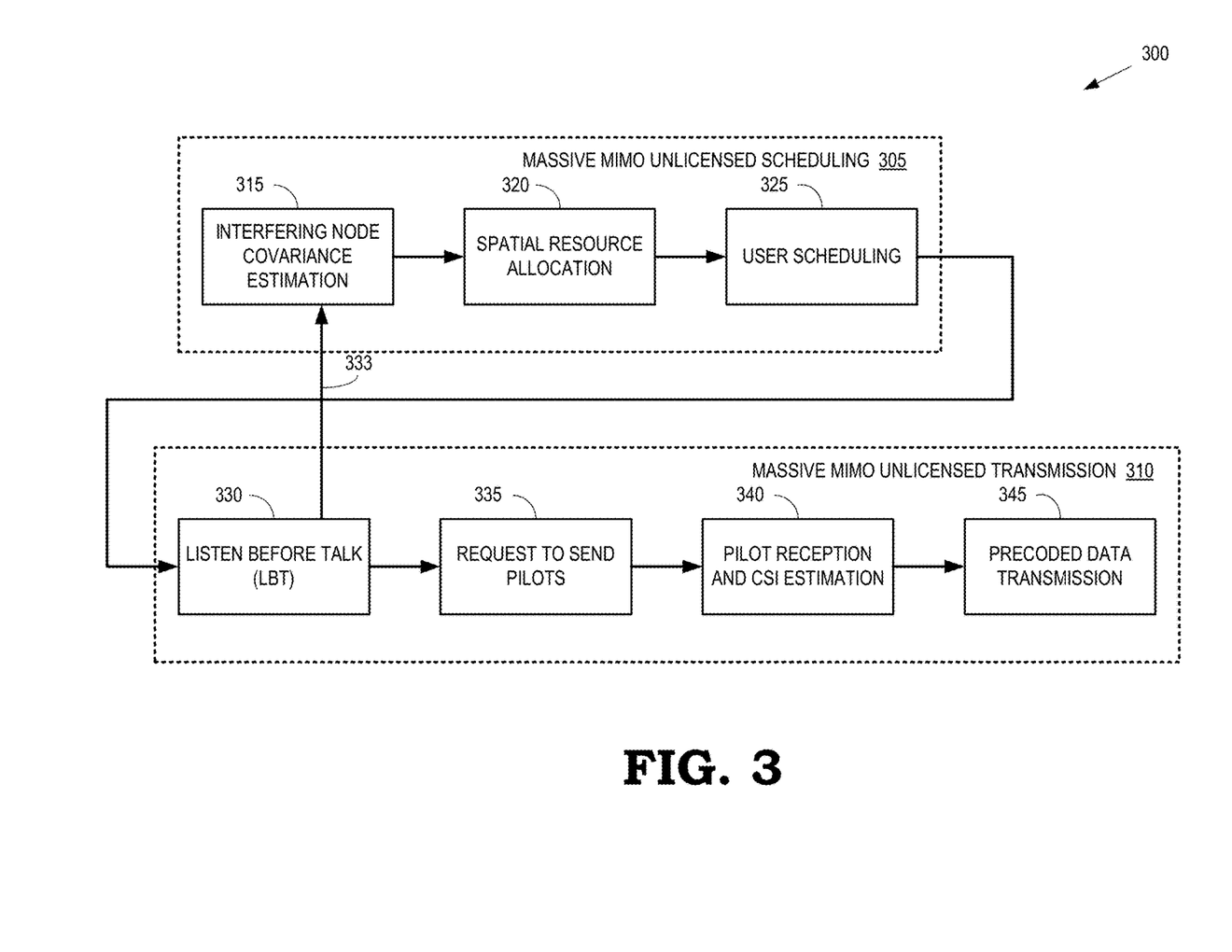
FIG. 3 is a block diagram of a node that is configured to be connected to a massive MIMO array according to some embodiments.

FIG. 3 is a block diagram of a node 300 that is configured to be connected to a massive MIMO array according to some embodiments. The node 300 is used to implement some embodiments of the node 105 shown in FIG. 1. The node 300 is configured to perform scheduling of communication using the massive MIMO array in the unlicensed frequency band in the scheduling block 305. The node 300 is configured to perform transmission of data in a first subspace of spatial channels while performing spatial nulling on a second subspace of spatial channels in the transmission block 310. Thus, the node 300 is configured to perform beamforming of downlink transmissions concurrently with spatial nulling. The node 300 is also able to perform multiplexing of uplink transmissions concurrently with spatial nulling using blocks that operate analogously to the scheduling block 305 and the transmission block 310.

The node 300 estimates a covariance matrix for one or more interfering nodes in the block 315. To estimate the covariance matrix, the node 300 interrupts or bypasses transmission during a silent time interval and monitors signals received by the massive MIMO array during the silent time interval. The duration of the silent time interval (which can be zero, indicating that there is no silent time interval for a particular iteration of the scheduling/transmission process) is determined based on a number of previously received and stored samples. The stored samples can be acquired during a previous silent time interval or the stored samples can be non-spatially filtered samples acquired during an LBT operation. For example, during an LBT operation, the node 300 can acquire non-spatially filtered samples during a monitoring interval prior to applying a spatial filter and determining whether any interfering nodes are present based on the spatially filtered samples.

The node 300 uses the stored samples to generate channel state information for interfering nodes, such as Wi-Fi nodes. The channel state information is used to suppress interference during subsequent data transmission and reception stages, e.g., after the silent time interval has expired. In some embodiments, the channel state information is used to generate a covariance matrix for the interfering nodes. For example, let $z[m] \in \mathbb{C}^{N \times 1}$ denote the sample received by the node 300 at symbol interval m in the N antenna elements in the massive MIMO array. The node 300 monitors the received signals during an interval of M symbols to collect a corresponding M samples and generates an estimate of their aggregate channel covariance matrix, $Z \in \mathbb{C}^{N \times N}$, as:

$$Z = \sum_{m=1}^{M} z[m]z^H[m]$$

where $(\cdot)^H$ denotes the conjugate transpose operation. The covariance matrix represents spatial channels between the massive MIMO array and the interfering nodes within its coverage region.

Spatial resources are allocated to downlink spatial channels and spatial nulls in the block 320. The node determines a number of spatial nulls that are allocated to interference suppression of the interfering nodes represented in the channel covariance matrix. Once the number of spatial nulls has been determined, the node 300 generates a spatial filter that represents the spatial channels used for beamforming downlink transmissions and the spatial nulls. The spatial filter can be applied to signals during the LBT operation and the data transmission phases.

The node 300 schedules users for communication in the unlicensed frequency band in the block 325. In the illustrated embodiment, data transmission for the scheduled users is contingent upon the node acquiring the unlicensed frequency band by performing a successful LBT operation.

The node 300 performs an LBT operation in the block 330. The LBT operation is performed on signals that are filtered on the basis of the spatial filter generated in block 320. For example, the node 300 first acquires non-spatially filtered samples by monitoring signals received while the node 300 is not transmitting during the LBT operation 330. The node 300 then applies a spatial filter to generate spatially filtered samples from the non-spatially filtered samples. Applying the spatial filter during the LBT operation is referred to as "enhanced LBT." To begin the LBT operation, the node 300 interrupts or bypasses transmissions and monitors non-spatially filtered signals received by the massive MIMO array. The non-spatially filtered signals are used to generate non-spatially filtered samples. The non-spatially filtered samples are stored during the LBT operation 330 so that the non-spatially filtered samples collected during the LBT operation 330 can be used to estimate the covariance matrix at block 305, as indicated by the arrow 333.

The node 300 applies spatial filter to the non-spatially filtered samples in the block 330 to remove signals received on the subspace of channels corresponding to the spatial nulls. Thus, signals received from interfering nodes in the spatial directions associated with the spatial nulls are not included in the signals that are used to determine whether a detected energy level in the received signals is above a threshold indicating that the unlicensed frequency band is occupied by another interfering node. If the detected energy level is above the threshold, the LBT operation 330 is unsuccessful and the node does not acquire the unlicensed frequency band. The node 300 does not perform the operations in the blocks 335, 340, 345 if the LBT operation 330 is unsuccessful. If the detected energy level is below the threshold, the LBT operation 330 is successful and the node 300 acquires the unlicensed frequency band.

The node 300 transmits (at block 335) a request for user equipment to send pilot signals, which the node 300 can use for channel estimation. Some embodiments of the node 300 broadcast the request on a spatial channel subspace that is orthogonal to directions of the strongest interfering nodes. For example, the node 300 can broadcast the request using the spatial filter determined in block 320. The node 300 receives pilot signals in block 340 and uses the pilot signals to estimate channel state information for the user equipment that transmitted the pilot signals. Some embodiments of the node 300 apply the spatial filter determined in block 320 to the received pilot signals so that signals transmitted by interfering nodes are suppressed by the spatial nulls represented by the spatial filter.

The node 300 performs the scheduled data transmissions in block 345. The data transmissions are precoded based on the spatial filter determined in block 320 to prevent the data transmissions from causing interference at the interfering nodes.

Figure 4:
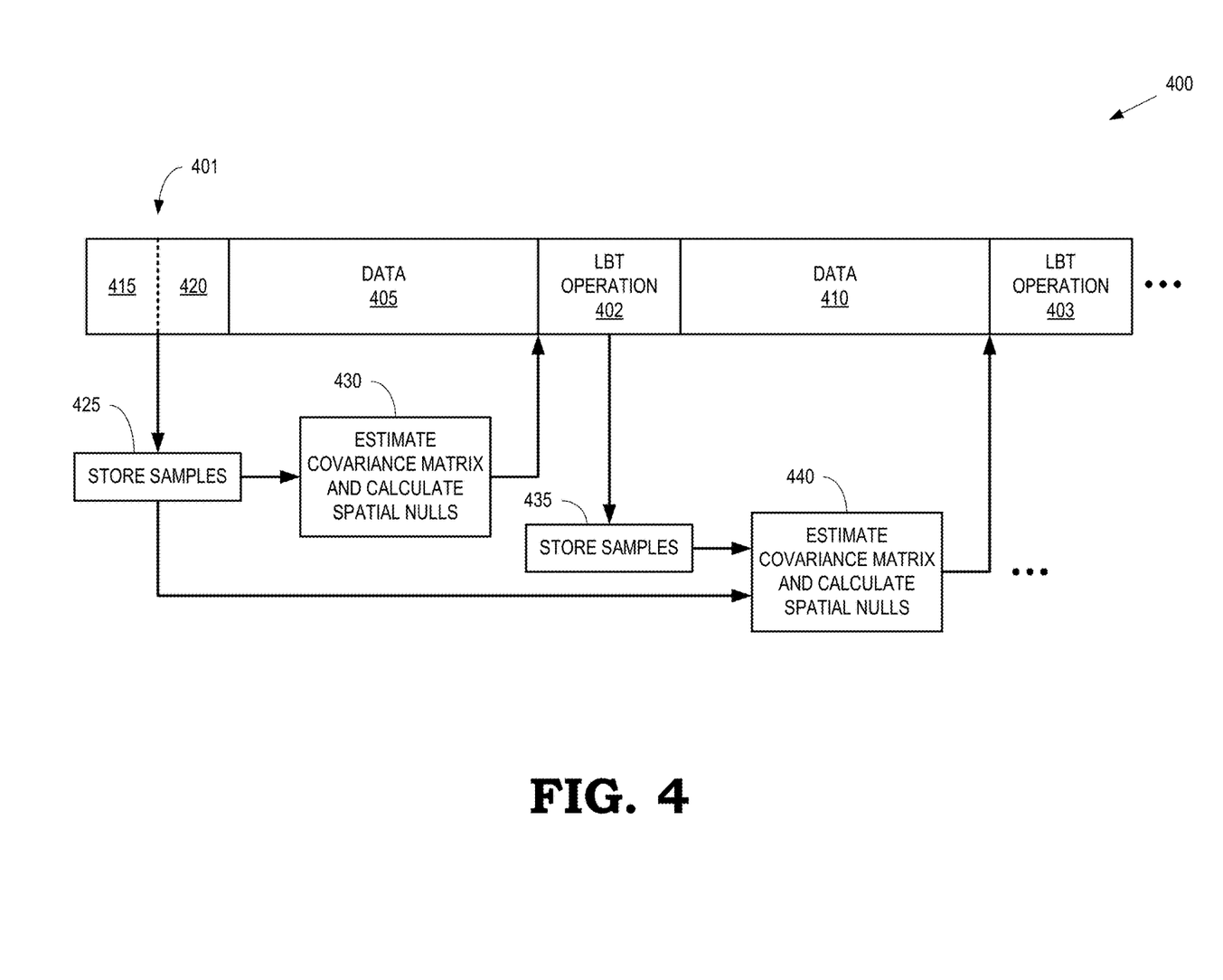
FIG. 4 is a block diagram that illustrates collection of non-spatially filtered samples during a sequence of LBT operations and data transmissions according to some embodiments.

FIG. 4 is a block diagram that illustrates collection of non-spatially filtered samples a sequence 400 of LBT operations and data transmissions according to some embodiments. The sequence 400 is implemented in a node such as some embodiments of the node 105 shown in FIG. 1 and the node 300 shown in FIG. 3. The sequence 400 includes LBT operations 401, 402, 403 that are collectively referred to herein as "the LBT operations 401-403." The sequence 400 also includes data transmissions 405, 410.

The LBT operation 401 includes a listening phase 415 in which the node interrupts or bypasses data transmissions on an unlicensed frequency band and acquires non-spatially filtered samples by monitoring signals received from interfering nodes in the unlicensed frequency band. For example, the node can acquire z[m] samples of signals transmitted by interfering nodes such as Wi-Fi nodes and received during m symbol intervals by a massive MIMO array connected to the node. The z[m] samples are acquired without applying a spatial filter to the received signals and are therefore referred to as non-spatially filtered samples. The node stores the z[m] samples in a memory at block 425. The LBT operation 401 also includes a comparison phase 420 in which the node applies a previously determined spatial filter to the z[m] samples and determines a total energy received in the spatially filtered signal. If the total received energy is above a threshold, indicating that interfering nodes are present on the monitored spatial channels defined by the spatial filter, the LBT operation 401 is unsuccessful and the node does not acquire the unlicensed frequency band. If the total received energy is below the threshold, indicating that interfering nodes are not present on the monitored spatial channels, the LBT operation 401 is successful and the node acquires the unlicensed frequency band.

Data transmission 405 is performed on the spatial channels defined by the spatial filter if the previous LBT operation 401 was successful. Otherwise, the data transmission 405 is bypassed if the previous LBT operation 401 was not successful. Data transmission 405 can include beamforming of downlink signals or multiplexing of uplink signals. At block 430, the node estimates a covariance matrix using the samples stored at block 425 concurrently with the data transmission 405 (if performed). The node also calculates a spatial filter that defines spatial channels (e.g., for beamforming or multiplexing) and spatial nulls for interference suppression based on the covariance matrix. The spatial filter is then used in a subsequent LBT operation 402.

Although not explicitly shown in FIG. 4, the LBT operation 402 includes a listening phase in which the node interrupts or bypasses data transmissions on an unlicensed frequency band and acquires non-spatially filtered samples by monitoring signals received from interfering nodes in the unlicensed frequency band. The node stores the non-spatially filtered samples in a memory at block 435. The LBT operation 402 also includes a comparison phase in which the node applies a previously determined spatial filter to the non-spatially filtered samples and determines a total energy received in the spatially filtered signal. If the total received energy is above a threshold, indicating that interfering nodes are present on the monitored spatial channels indicated by the spatial filter, the LBT operation 402 is unsuccessful and the node does not acquire the unlicensed frequency band. If the total received energy is below the threshold, indicating that interfering nodes are not present on the monitored spatial channels, the LBT operation 402 is successful and the node acquires the unlicensed frequency band.

Data transmission 410 is performed on the spatial channels defined by the spatial filter if the previous LBT operation 402 was successful. Otherwise, the data transmission 410 is bypassed if the previous LBT operation 402 was not successful. Data transmission 410 can include beamforming of downlink signals or multiplexing of uplink signals. At block 440, the node estimates a covariance matrix using the samples stored at block 435 concurrently with the data transmission 410 (if performed). The node also calculates a spatial filter that defines spatial channels (e.g., for beamforming or multiplexing) and spatial nulls for interference suppression based on the covariance matrix. The spatial filter is then used in a subsequent LBT operation 403.

In some cases, the number of samples collected in the LBT operations 401-403 are insufficient to provide an optimal estimate of the covariance matrix, as discussed herein with regard to FIG. 2. Stored samples can also be discarded after a validity time interval, which further reduces the number of samples available to estimate the covariance matrix. The node is therefore configured to dynamically allocate silent time intervals to collect additional non-spatially filtered samples that can be used in combination with the samples collected during the LBT operations 401-403 to estimate the covariance matrices.

Figure 5:
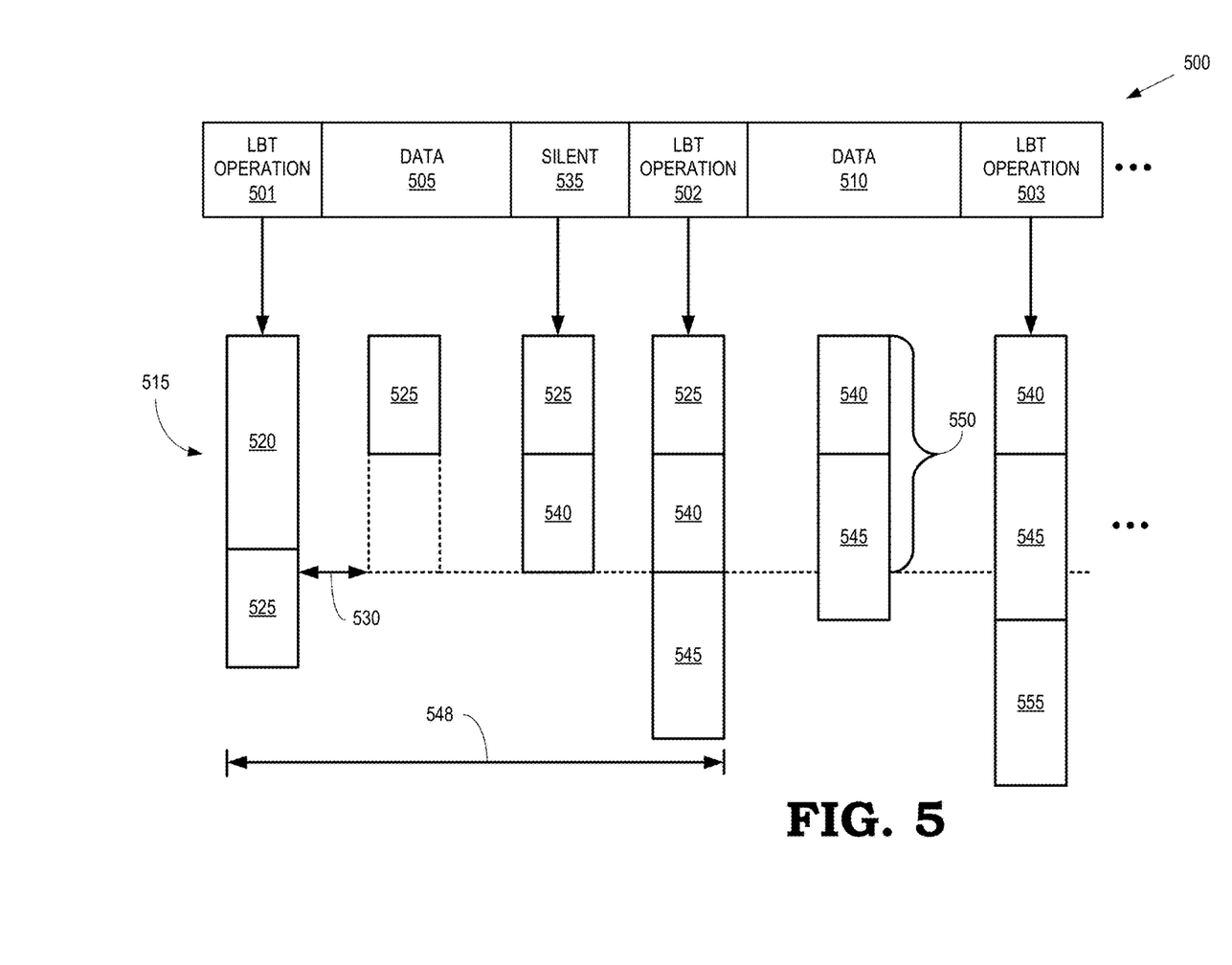
FIG. 5 is a block diagram that illustrates collection of non-spatially filtered samples during a sequence of LBT operations, data transmissions, and silent time intervals according to some embodiments.

FIG. 5 is a block diagram that illustrates collection of non-spatially filtered samples a sequence 500 of LBT operations, data transmissions, and silent time intervals according to some embodiments. The sequence 500 is implemented in a node such as some embodiments of the node 105 shown in FIG. 1 and the node 300 shown in FIG. 3. The sequence 500 includes LBT operations 501, 502, 503 that are collectively referred to herein as "the LBT operations 501-503." The sequence 500 also includes data transmissions 505, 510.

As discussed herein with regard to FIG. 4, the node can acquire and store non-spatially filtered samples during the LBT operation 501 and the non-spatially filtered samples can be stored in a memory 515. In the illustrated embodiment, the memory 515 includes previously stored non-spatially filtered samples 520 and the non-spatially filtered samples 525 that were acquired during the LBT operation 501. The total number of samples in the memory 515 is currently above a number 530 of samples that are used to estimate covariance matrices for spatially filtering samples during the LBT operations 501-503 and data transmissions 505, 510. However, a validity time interval for the previously acquired samples 520 expires during the data transmission 505, or at least prior to the subsequent LBT operation 502. The previously acquired samples 520 are therefore discarded from the memory 515, which now stores less than the number 530 that is needed to estimate covariance matrices.

In response to determining that the number of samples stored in the memory 515 is less than the number 530 of samples used to estimate the covariance matrices, the node schedules a silent time interval 535 during which the node interrupts or bypasses transmissions and monitors signals received from interfering nodes. The node collects and stores the non-spatially filtered samples 540 during the silent time interval 535. The node determines the duration of the silent time interval 535 so that the silent time interval 535 is long enough to permit the node to acquire a number of non-spatially filtered samples 540 that is equal to a difference between the number of currently stored samples 525 and the number 530 of samples that are used to estimate the covariance matrices. Thus, the node is able to acquire a sufficient number of samples to estimate the covariance matrices using a minimal duration of the silent time interval 535.

The node performs the LBT operation 502 using a spatial filter determined based on the stored samples 525, 540. For example, the node acquires non-spatially filtered samples during a listening phase of the LBT operation 502 and applies the spatial filter determined based on the stored samples 525, 540 during a comparison phase that is used to determine whether the LBT operation is successful or not. The node also stores the acquired non-spatially filtered samples 545 in the memory for subsequent use determining covariance matrices.

A validity time interval 548 for the previously acquired samples 525 expires during the data transmission 510, or at least prior to the subsequent LBT operation 503. The previously acquired samples 525 are therefore discarded from the memory 515. However, the memory 515 still stores a number of samples 540, 545 that is greater than or equal to the number 530 that is needed to estimate covariance matrices. Consequently, the node does not need to acquire any additional samples to estimate the covariance matrices. The node therefore does not introduce a silent time interval between the data transmission 510 and the subsequent LBT operation 503. For example, the node can set the duration of the silent time interval equal to zero.

The node performs the LBT operation 503 using a spatial filter determined based on a portion 550 of the stored samples 540, 545 that includes a number of samples equal to the number 530. For example, the node acquires non-spatially filtered samples during a listening phase of the LBT operation 503 and applies the spatial filter determined based on the portion 550 of the stored samples 540, 545 during a comparison phase that is used to determine whether the LBT operation is successful or not. The node also stores the acquired non-spatially filtered samples 555 in the memory for subsequent use determining covariance matrices.

Figure 6:
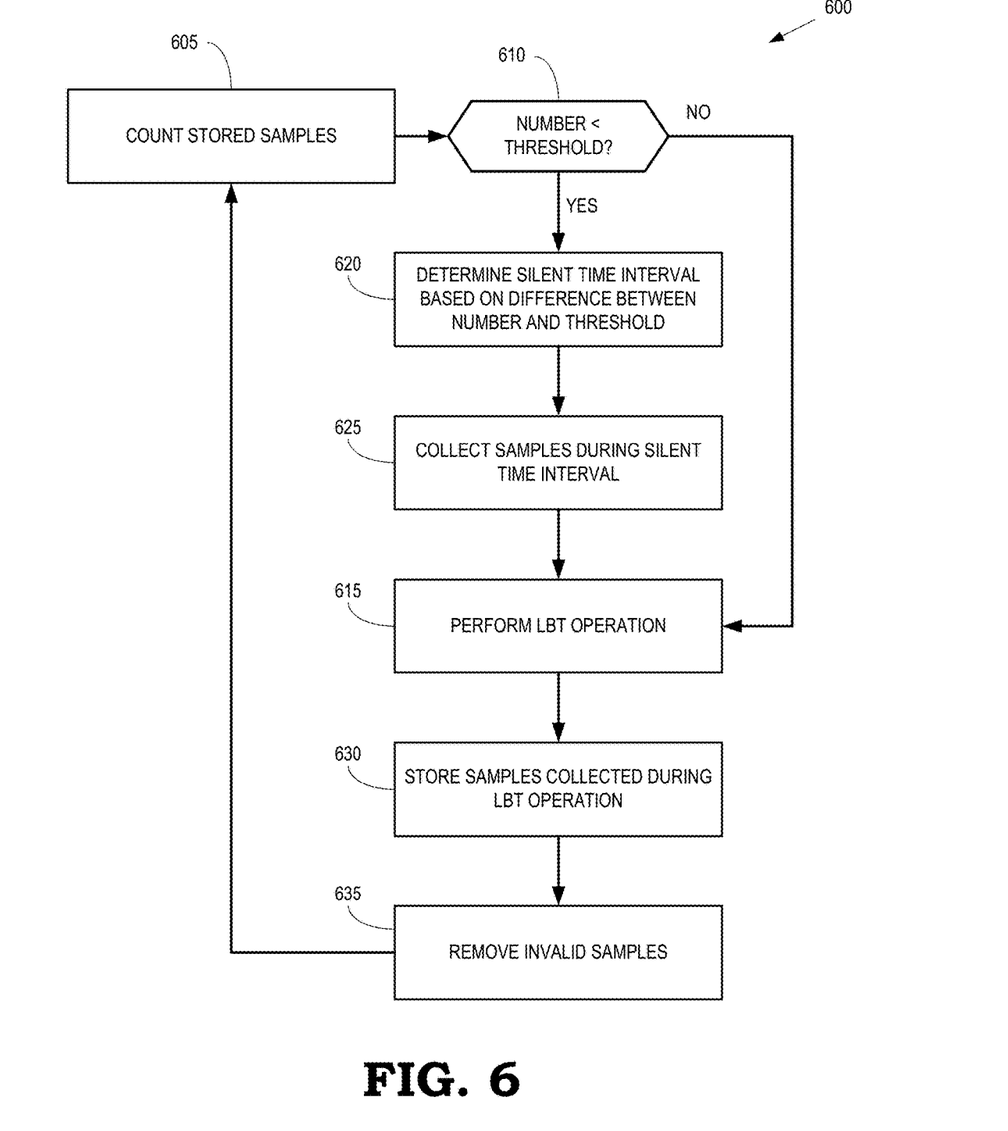
FIG. 6 is a flow diagram of a method of collecting non-spatially filtered samples during adaptively determined silent time intervals according to some embodiments.

FIG. 6 is a flow diagram of a method 600 of collecting non-spatially filtered samples during adaptively determined silent time intervals according to some embodiments. The method 600 is implemented in a node such as some embodiments of the node 105 shown in FIG. 1 and the node 300 shown in FIG. 3.

At block 605, the node counts the number of samples that are stored in a memory. At decision block 610, the node determines whether the number of stored samples is less than a threshold that indicates a number of samples that are used to calculate a covariance matrix, which is then used to determine a spatial filter for a massive MIMO array. If the number is greater than or equal to the threshold, the method 600 flows to block 615. Otherwise, if the number is less than the threshold, the method 600 flows to block 620.

At block 620, the node determines a silent time interval based on a difference between the number of stored samples and the threshold value. For example, the node can determine a duration of the silent time interval that is sufficient to allow the node to acquire a number of non-spatially filtered samples that is equal to the difference between the number of stored samples and the threshold value. At block 625, the node collects the non-spatially filtered samples during the silent time interval and stores the collected samples in the memory. The method 600 then flows to block 615.

At block 615, the node performs an LBT operation using a spatial filter determined by a covariance matrix that is defined by samples previously stored in the memory. As discussed herein, the LBT operation includes a listening phase in which the node acquires additional non-spatially filtered samples prior to applying a spatial filter to the acquired samples, e.g., in a comparison phase. At block 630, the node stores the additional non-spatially filtered samples acquired during the LBT operation in the memory. At block 635, the node removes invalid samples from the memory. For example, samples that have been in the memory for longer than a validity time interval are removed from the memory. The method 600 then flows back to block 605 to begin another iteration.

Figure 7:
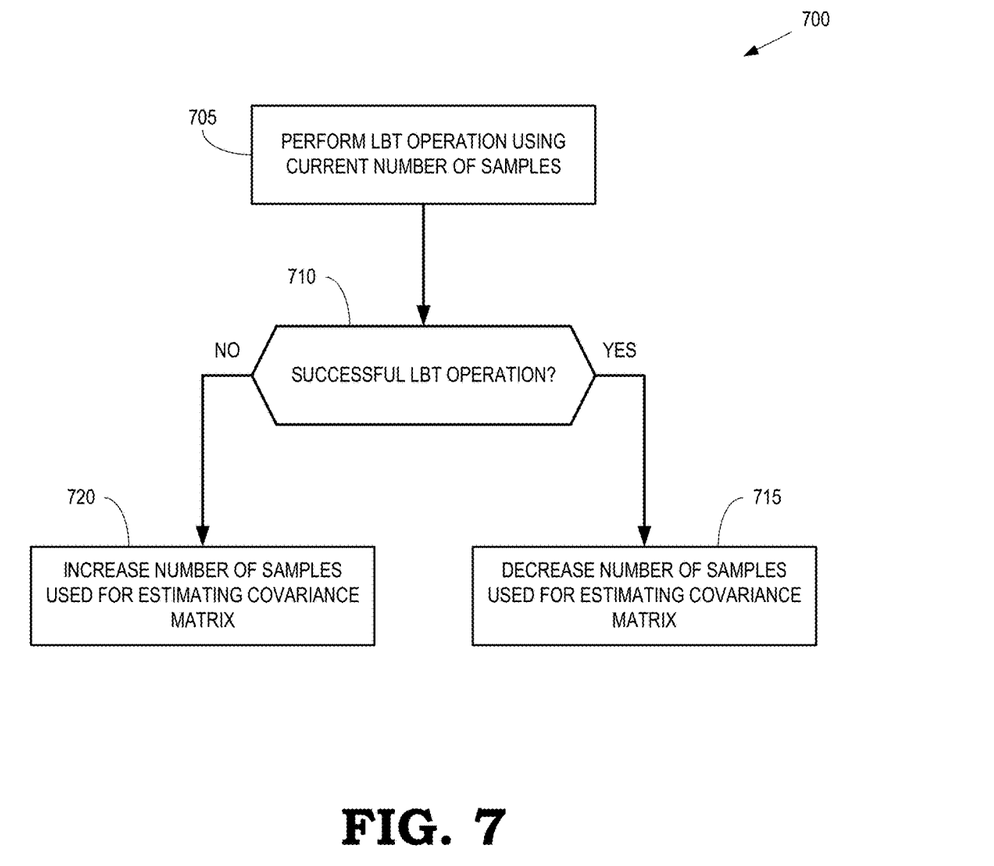
FIG. 7 is a flow diagram of a method for adaptively modifying the number of samples that are used to calculate covariance matrices according to some embodiments.

FIG. 7 is a flow diagram of a method 700 for adaptively modifying the number of samples that are used to calculate covariance matrices according to some embodiments. The method 700 is implemented in a node such as some embodiments of the node 105 shown in FIG. 1 and the node 300 shown in FIG. 3.

At block 705, the node performs an LBT operation on the basis of a spatial filter that is determined using a covariance matrix generated using a current number of samples. In some embodiments, the current number of samples is set using a conservative approach that initializes the number of samples to a large value so that the estimate of the covariance matrix is accurate. Alternatively, a greedy approach can be used to initialize the current number of samples to a relatively small value.

At decision block 710, the node determines whether the LBT operation was successful and whether the node acquired the unlicensed frequency band. For example, the node can determine the amount of energy detected on spatial channels defined by the spatial filter and compare the detected energy to a threshold value. The LBT operation is successful if the detected energy is below the threshold value and unsuccessful if the detected energy is above the threshold value. If the LBT operation is successful, the method 700 flows to block 715. If the LBT operation is unsuccessful, the method 700 flows to block 720.

At block 715, the node decreases the number of samples that are used for estimating the covariance matrix. Decreasing the number of samples decreases the overhead incurred to acquire samples used to estimate the covariance matrix. In some embodiments, the number of samples is selectively decreased based on a predicted outcome of the LBT operation if it had been performed using a subset of the available samples that includes the decreased number of samples. The number of samples is decreased if the predicted outcome of the LBT operation is a successful result and the number of samples is maintained if the predicted outcome of the LBT operation is unsuccessful result.

At block 720, the node increases the number of samples that are used for estimating the covariance matrix. Although increasing the number of samples increases the overhead incurred to acquire samples, increasing the number of samples also increases the accuracy of the estimated covariance matrix and increases the likelihood that a subsequent LBT operation will be successful. In some embodiments, the number of samples is selectively increased based on a predicted outcome of the LBT operation assuming that the LBT operation had been performed using a larger number of samples. For example, if the memory includes additional samples that were not used to estimate the covariance matrix in block 705, the node can generate a modified covariance matrix using a large number of samples. If the predicted outcome of the LBT operation using the modified covariance matrix is successful, the number of samples used to perform the covariance estimation is increased. If the predicted outcome of the LBT operation using the modified covariance matrix is still unsuccessful, the number of samples used to perform the covariance estimation is maintained. Furthermore, an unsuccessful predicted outcome of the LBT operation using the modified covariance matrix could indicate that the LBT operation was unsuccessful because the samples were outdated and not because there was an insufficient number of samples. In that case, a validity time interval applied to the samples can be decreased.

In some embodiments, filters and a hysteresis margin are applied in method 700 to mitigate possible ping-pong effects.

Figure 8:
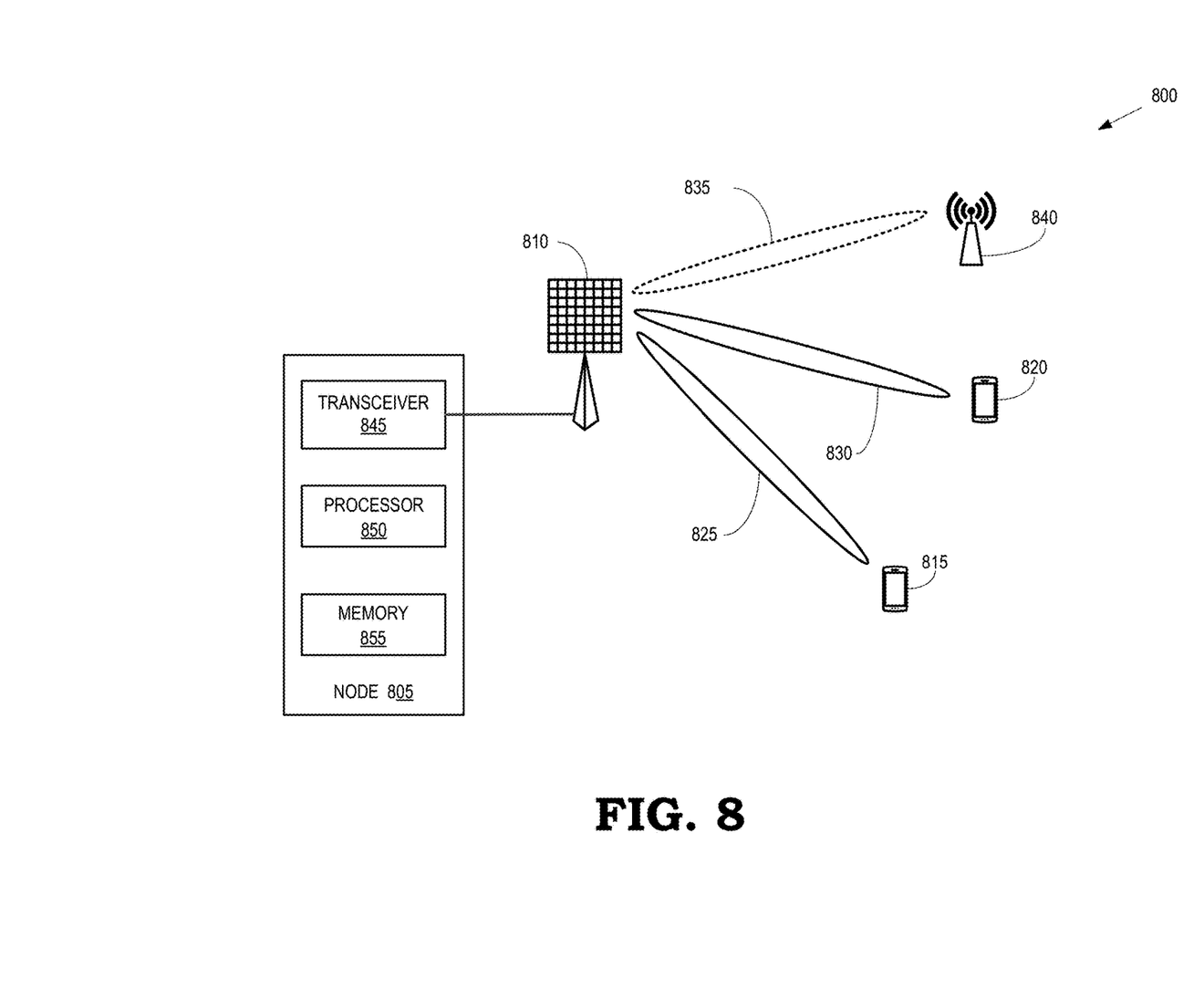
FIG. 8 is a block diagram of a wireless communication system that performs adaptive allocation of temporal resources to sample acquisition according to some embodiments.

FIG. 8 is a block diagram of a wireless communication system 800 that performs adaptive allocation of temporal resources to sample acquisition according to some embodiments. The wireless communication system 800 includes a node 805 that is connected to a massive MIMO array 810 for providing wireless connectivity to user equipment 815, 820 using spatial channels 825, 830. The node 805 can also place spatial nulls 835 on to spatial directions indicated by a location of an interfering node 840.

The node 805 includes a transceiver 845 for transmitting and receiving signals such as signals that are exchanged between the node 805 and the massive MIMO array 810. The transceiver 845 can be implemented as a single integrated circuit (e.g., using a single ASIC or FPGA) or as a system-on-a-chip (SOC) that includes different modules for implementing the functionality of the transceiver 845. The node 805 also includes a processor 850 and a memory 855. The processor 850 can be used to execute instructions stored in the memory 855 and to store information in the memory 855 such as the results of the executed instructions. For example, the memory 855 can store non-spatially filtered samples collected during an LBT operation or a silent time interval. The transceiver 845, the processor 850, and the memory 855 can therefore be configured to implement some embodiments of the node 300 shown in FIG. 3. The transceiver 845, the processor 850, and the memory 855 can also be configured to perform some embodiments of the method 600 shown in FIG. 6 and the method 700 shown in FIG. 7.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for implementation in a node configured for connection to a massive multiple-input, multiple-output (MIMO) array to provide spatially multiplexed channels in an unlicensed frequency band, the method comprising:
   storing, in a memory of the node, samples of non-spatially filtered signals received by the node during a first listen-before-talk (LBT) operation used to acquire the unlicensed frequency band;
   determining, based on a number of previously stored samples, a duration of a silent time interval during which the node collects samples of non-spatially filtered signals and stores the samples in the memory; and
   performing a second LBT operation to acquire the unlicensed frequency band using a spatial filter determined based on the samples stored in the memory.

2. The method of claim 1, wherein storing the samples comprises storing the samples in the memory for a validity time interval and removing the samples from the memory in response to expiration of the validity time interval.

3. The method of claim 2, wherein determining the duration of the silent time interval comprises determining the duration of the silent time interval based on a difference between a number of samples stored in the memory and a target number of samples used to estimate a covariance matrix that is used to define the spatial filter.

4. The method of claim 3, wherein determining the duration of the silent time interval comprises setting the duration of the silent time interval equal to zero in response to the number of samples stored in the memory being equal to or greater than the target number of samples.

5. The method of claim 3, wherein determining the duration of the silent time interval comprises setting the duration of the silent time interval equal to a value sufficient to acquire a number of samples equal to a difference between the target number and the number of samples stored in the memory in response to the number of samples stored in the memory being less than the target number of samples.

6. The method of claim 3, further comprising:
   determining whether the second LBT operation was successful and the node acquired the unlicensed frequency band.

7. The method of claim 6, further comprising:
   decreasing the target number of samples in response to the second LBT operation being successful and the node acquiring the unlicensed frequency band.

8. The method of claim 6, further comprising:
   increasing the target number of samples in response to the second LBT operation being unsuccessful and the node failing to acquire the unlicensed frequency band.

9. A node configured for connection to a massive multiple-input, multiple-output (MIMO) array to provide spatially multiplexed channels in an unlicensed frequency band comprising:
   a memory configured to store samples of non-spatially filtered signals received by the node during a first listen-before-talk (LBT) operation used to acquire the unlicensed frequency band;
   a processor configured to determine, based on a number of previously stored samples, a duration of a silent time interval during which the node collects samples of non-spatially filtered signals and stores the samples in the memory; and
   a transceiver configured to perform a second LBT operation to acquire the unlicensed frequency band using a spatial filter determined based on the samples stored in the memory.

10. The node of claim 9, wherein the memory is configured to store a samples for a validity time interval, and wherein the samples are removed from the memory in response to expiration of the validity time interval.

11. The node of claim 10, wherein the processor is configured to determine the duration of the silent time interval based on a difference between a number of samples stored in the memory and a target number of samples used to estimate a covariance matrix that is used to define the spatial filter.

12. The node of claim 11, wherein the processor is configured to set the duration of the silent time interval equal to zero in response to the number of samples stored in the memory being equal to or greater than the target number of samples.

13. The node of claim 11, wherein the processor is configured to set the duration of the silent time interval equal to a value sufficient to acquire a number of samples equal to a difference between the target number and the number of samples stored in the memory in response to the number of samples stored in the memory being less than the target number of samples.

14. The node of claim 11, wherein the processor is configured to determine whether the second LBT operation was successful and the node acquired the unlicensed frequency band.

15. The node of claim 14, wherein the processor is configured to decrease the target number of samples in response to the second LBT operation being successful and the node acquiring the unlicensed frequency band.

16. The node of claim 14, wherein the processor is configured to increase the target number of samples in response to the second LBT operation being unsuccessful and the node failing to acquire the unlicensed frequency band.

* * * * *